United States Patent Office 3,017,414
Patented Jan. 16, 1962

3,017,414
PIGMENT PRODUCTION
John W. Minnich, Wilmington, Del., and Ronald L. Sweet, Westfield, N.J., assignors to E. I. du Pont de Nemours and Company, Wilmington, Del., a corporation of Delaware
No Drawing. Filed May 20, 1959, Ser. No. 814,405
10 Claims. (Cl. 260—279)

This invention relates to a new process for obtaining phthalocyanine and other pigments in pigmentary particle sizes.

Many colored pigments in use today are organic compounds which have been prepared by chemical reaction. These compounds, as prepared, are often in a relatively large particle size, and satisfactory pigmentary properties are attained only after the compounds have been subjected to particle size reduction. Particle size for most pigmentary purposes is usually below 0.2 micron and preferably below 0.1 micron.

Many attempts have been made to reduce the particle size of such organic pigments by merely grinding them in a dry form without the addition of any added agents, but they have been without success in the past. For instance, when either a crude copper phthalocyanine pigment or a crude quinacridone pigment is ball-milled in the dry state in the absence of any added inert substance such as sodium chloride or borax, there is no evidence of any substantial reduction in particle size when examined by any of the tests usually applied to such pigments. There is no increase in tinctorial strength; rather, it is common to observe a marked decrease in strength. There is no improvement in intensity of color, nor is there any evidence of significantly smaller particle size by either microscopic observation or surface area measurements. These tendencies are particularly serious when the grinding is done in a ball mill; and it has even been observed that a small particle size copper phthalocyanine finished by other methods will revert largely to the properties of a crude pigment when subjected to dry grinding in a ball mill. The effect is not limited to ball mill grinding; it is observed to a lesser degree in other dry grinding methods, such as may be found in a hammer mill or even in a mortar and pestle. Recently, it has been found that although the products of dry grinding are not valuable in themselves as noted above, such products appear to be peculiarly conditioned so that a small amount of violent agitation in the presence of a suitable organic liquid brings about the required particle size reduction in a very short time. This new and improved process and the advantages accruing therefrom are disclosed in U.S. Patent 2,857,400 to J. H. Cooper. Also disclosed in this patent, however, is the fact that the process requires relatively large amounts of an organic liquid and an apparatus such as a homogenizer for subjecting the mixture of pigment and organic liquid to violent agitation. The present invention utilizes the dry-milling step of U.S. Patent 2,857,400, but it has now been found that with certain organic pigments, such as phthalocyanine and quinacridone pigments, the second step of subjecting the mixture to violent agitation while slurried in an organic liquid can be replaced by a step of simply contacting the dry-milled pigment with a water emulsion of certain organic liquids. The latter procedure is, of course, a much simpler process, and because of its simplicity and the utilization of water in the step of treating the dry-milled pigment, it has a definite economic advantage.

In the process of this invention for reducing the particle size of colored pigments, the pigment is first dry-milled in a milling apparatus having an attrition and shearing action. Thereafter, it is contacted with an organic liquid in water emulsion wherein the liquid is selected from the group consisting of nitrobenzene, benzonitrile, unsubstituted aromatic hydrocarbons, chlorinated aromatic hydrocarbons, and chlorinated aliphatic hydrocarbons, boiling between about 100° C.–250° C. After contact with the emulsion, the major portion of the organic liquid is removed from the pigment, preferably by steam distillation. Recovery of the pigment after it has been separated from the organic liquid is accomplished by conventional means such as by filtering the pigment, washing it free of soluble salts, and drying.

Dry-milling, as used in this invention, means milling in the complete absence of liquids or, if liquids are used, such as a phase-directing solvent or a surface-active agent, they are present in such small amounts that the pigment retains the characteristics of a dry powder.

In a preferred embodiment of this invention, a crude phthalocyanine or quinacridone pigment is ground in a conventional manner in a ball mill in the dry state and in the absence of any grinding aid other than the grinding elements. After this dry-milling step, the pigment is mixed with sufficient water to form a slurry. The organic liquid, preferably o-dichlorobenzene, monochlorobenzene, or tetrachloroethylene, is then added to the pigment-water slurry in an amount of at least 30% based on the weight of the pigment. Also added at this time is a small amount of surface-active agent sufficient to emulsify the organic liquid in the water. The resulting slurry is stirred for at least 1 hour and heated at an elevated temperature, whereupon the major portion of the organic liquid is removed by steam distillation. The pigment is then recovered from the resulting aqueous slurry by conventional filtration, washing, and drying. As an alternative in this preferred embodiment, contact between the pigment and the emulsion may be accomplished by ball milling rather than stirring. This alternative procedure of ball milling in the emulsion-treating step is preferred when the pigment is green-shade copper phthalocyanine in the beta crystal phase.

For a clearer understanding of the invention, the following specific examples are given. These examples are intended to be merely illustrative of the invention and not in limitation thereof. Unless otherwise specified, all parts are by weight.

*Example I*

18 parts of a polychloro copper phthalocyanine (obtained by direct chlorination of copper phthalocyanine and containing about 14.5 atoms of chlorine per molecule. Commercial polychloro copper phthalocyanines usually analyze less than 16 atoms of chlorine which is the theoretical for complete chlorination) is charged to a ball mill containing about 1000 parts of "Cyl-pebs" ("Cyl-pebs" are steel rods approximately ⅝" x 1"). The size of the mill should be such that the full charge of pigment and grinding elements occupies approximately 60–65% of the total volume of the mill. The mill is rotated at about 70% of the critical speed (the critical speed is that at which the centrifugal force overcomes the force of gravity so that the grinding elements would be retained against the outer wall of the mill) for about 6 hours. The dry powder is discharged from the mill through a suitable screen. 15 parts of this dry powder is then slurried in 200 parts of water containing 1 part of sodium hydroxide following which 10 parts of o-dichlorbenzene containing 0.75 part of hydrogenated rosin dissolved therein is added to the slurry. The mixture is then heated to the boil by the introduction of live steam, and steam distillation is then maintained until the o-dichlorbenzene is removed. The pigment is then recovered by filtering, washing free of soluble salts, and drying at about 80° C. to give 15 parts of a high-strength polychloro copper phthalocyanine pigment. This pigment is equal in strength and quite intense in hue as compared to a product made from the same crude pigment according to the solvent milling method of U.S. Patent 2,556,727.

*Example II*

In this example, the process is applied to a copper phthalocyanine pigment containing about 4.5% chlorine (obtained by the reaction of 4-chlorophthalic acid and phthalic anhydride with urea and copper chloride in kerosene and in the presence of ammonium molybdate as a catalyst). Except for the difference in starting material, the milling operation is the same as that shown in the first part of Example I. 60 parts of such a dry-milled crude copper phthalocyanine is slurried in 800 parts of water containing 2 parts of sodium hydroxide. 90 parts of o-dichlorbenzene containing 3 parts of hydrogenated rosin dissolved therein is added to the mixture and it is stirred vigorously for about 2 hours at a temperature of 80° C. to 90° C. It is then heated with live steam to the boil, and steam distillation is maintained until the o-dichlorbenzene is removed. After removal of the organic liquid, 45 parts of concentrated sulfuric acid is added to the pigment slurry, and it is boiled for about ½ hour. The pigment is then filtered, washed free of soluble salts with water, and then washed further with a dilute aqueous solution of ammonia, and finally dried at about 75° C. 60 parts of a high-strength phthalocyanine blue pigment resulted.

*Example III*

The pigment of this example is a flocculation-resistant copper phthalocyanine containing both chlorine and sulfonic acid groups. It was made by reacting a suitable mixture of 4-sulfophthalic acid, 4-chlorophthalic acid and phthalic anhydride with urea and copper chloride in the presence of kerosene and ammonium molybdate as a catalyst. The process of preparation is described in U.S. Patent 2,799,594. The milling operation is carried out as described in Example I except that it is continued for only 3 hours. 60 parts of the resulting dry-milled crude pigment is slurried in about 800 parts of water containing 2 parts of sodium hydroxide. 90 parts of o-dichlorobenzene in which 3 parts of hydrogenated rosin is dissolved is added to the mixture and it is stirred vigorously for about 2 hours at a temperature of 80° C. to 90° C. It is then heated to the boil with live steam and the introduction of live steam is continued until substantially all of the o-dichlorobenzene is removed. The slurry is then acidified with about 45 parts of concentrated sulfuric acid, boiled for about ½ hour, filtered, washed free of soluble salts, and dried at about 75° C. to give 60 parts of a high-strength, flocculation-resistant, crystal-stable copper phthalocyanine blue pigment.

*Example IV*

18 parts of a substantially chlorine-free copper phthalocyanine is milled for six hours in the manner described in Example I except that 1.5 parts of "Igepal CO-710" (a polyoxyethylated nonylphenol sold by General Aniline & Film Corp.) is added to the pigment before the milling is begun. Twenty parts of the milled pigment is then mixed with 1000 parts of water containing 2 parts of sodium hydroxide to which 1 part of hydrogenated rosin is then added, followed by the addition of 30 parts of o-dichlorbenzene. This mixture is stirred at room temperature for about 2 hours, and then the o-dichlorbenzene is removed by steam distillation. The pigment is recovered from the slurry by filtration, washing well with water, washing with 20% sulfuric acid, and finally washing sulfate free with water, and then drying at 70° C.–80° C. to give a high-strength beta phase copper phthalocyanine pigment.

*Example V*

A polychloro copper phthalocyanine green pigment is milled as described in the first part of Example I after which 75 parts of such a dry-milled crude pigment is charged to a ball mill containing 200 parts of water, 1 part of sodium hydroxide, 100 parts of o-dichlorbenzene, 3 parts of hydrogenated rosin, and 2300 parts of ⅛" steel shot. The ball mill is rotated for 16 hours, after which the charge is separated from the steel shot, diluted with water, and then the o-dichlorbenzene is removed by steam distillation. The pigment is finally isolated by filtering, washing well with water, and drying at 80° C. to give a high-strength intense copper phthalocyanine green pigment.

*Example VI*

50 parts of a crude copper phthalocyanine (substantially free of chlorine and substantially all in the beta crystal phase) together with 1000 parts of "Cyl-pebs" and 100 parts of 20 d. nails are charged to a ball mill of such a size that it is slightly more than half full. The mill is rotated at about 75% of critical speed for about 18 hours. The pigment is then discharged from the mill as a dry powder. On X-ray examination, it is found to be partially (50–75%) converted to the alpha phase.

12 parts of the dry-milled pigment is then added to a ball mill with 100 parts of water, about 3.5 parts of tetrachloroethylene, about 0.6 part of "Igepal CO-710," and 600 parts of ⅛" steel shot. The charge is milled at about 75% of critical speed for about 24 hours. After this, the slurry is discharged from the mill and diluted with about 2000 parts of water, about 80 parts of 98% $H_2SO_4$ is added and heated at the boil for 1–2 hours, during which time most of the tetrachloroethylene is effectively removed by steam distillation. It is then filtered, washed acid-free, and dried to give a green shade beta phase copper phthalocyanine of excellent tinctorial strength.

The following variations on this process may be used:

(a) The surface-active agent in substantially the same proportions may be incorporated in the initial dry-milling step.

(b) A portion of the tetrachloroethylene may be incorporated in the initial dry-milling step, but the amount should not be so great as to cause the pigment to lose the characteristics of a dry powder. A satisfactory ratio is about 4 parts of liquid per 50 parts of pigment. Tetrachloroethylene is a phase-directing liquid for chlorine-free copper phthalocyanine, and its presence in the dry milling step maintains the phthalocyanine almost completely in the beta crystal phase.

(c) The total amount of tetrachloroethylene may vary between about 30 parts of about 60 parts per 100 parts of pigment. Other liquid chlorinated hydrocarbons and aromatic hydrocarbons boiling above about 100° C., such as xylene, chlorobenzene, and trichlorobenzene, may be used in its place.

(d) The amount of surface-active agent may vary between about 2.0 and 8.0 parts per 100 parts of pigment. The particular surface-active agent used is not critical except in so far as it must produce the desired emulsion.

*Example VII*

18 parts of a partially chlorinated copper phthalocyanine (about 4.5% chlorine) is charged to a ball mill with 1000 parts of "Cyl-pebs," as described in Example I, and milled for about 6 hours. After discharge from the mill, 12 parts of the dry-milled pigment is charged to a ball mill with 100 parts of water, 0.6 part of "Igepal CO-710," 3.5 parts of tetrachloroethylene, and 600 parts of steel shot. The charge is then milled at about 75% of critical speed for about 18 hours, discharged from the mill, diluted with water (about 2000 parts) and acidified with about 80 parts of concentrated $H_2SO_4$. It is then boiled for about ½ hour to facilitate the solution of acid-soluble impurities and to bring about the effective removal of most of the organic solvent by steam distillation. After isolation by conventional filtration, washing and drying, there is obtained a red shade copper phthalocyanine of excellent tinctorial strength and of high stability to crystal growth in solvents.

The variations shown as applicable to Example VI may also be used with this pigment. However, there is no advantage in using a phase-directing liquid in the dry-milling step since the partially chlorinated copper phthalocyanine will not change in crystal phase during this operation.

*Example VIII*

30 parts of a crude quinacridone pigment in the gamma crystal phase (see U.S. Patent 2,844,581) is charged to a ball mill together with 1000 parts of ½" steel balls and 200 parts roofing nails. The charge is milled in a conventional manner, and the dry pigment is then separated from the grinding elements. Fifteen parts of the separated pigment is then suspended in 200 parts of water to which has been added 0.3 part of "Quaternary O" (a high-molecular-weight imidazolinium compound—Geigy Chemical Corporation), 9 parts of conc. $H_2SO_4$ and about 9 parts of monochlorobenzene. The mixture is heated to the boil under good agitation and boiled for about 2 hours, whereupon substantially all of the solvent is effectively removed by steam distillation. The pigment is then filtered, washed acid-free, and dried to give a gamma crystal phase quinacridone pigment having high tinctorial strength.

It can be seen from the above examples that the process of this invention is especially applicable to the particle size reduction of various copper phthalocyanine pigments, including unsubstituted copper phthalocyanine, the partially chlorinated and the substantially fully chlorinated species, as well as copper phthalocyanine containing other substituents such as the sulfonic acid group. It is well known in the art that unsubstituted copper phthalocyanine is capable of existing in two crystal phases: a red shade product, herein called the alpha phase in accordance with F.I.A.T. Report 1313 (PB–85172), vol. III; and the much greener product, herein called the beta phase in accordance with U.S. Patent 2,556,726. It is also known that the method of particle size reduction often influences the crystal phase of such pigments. For example, it is known that, in the presence of crystallizing solvents, chlorine-free copper phthalocyanine tends to be converted to the beta crystal phase. Thus, the application of this invention to the chlorine-free product of Examples IV and VI results in beta phase copper phthalocyanine. On the other hand, chlorine-containing phthalocyanines generally exist only in one phase and this is not affected by the application of this invention. Thus, the products of Examples II, III, and VII with about 4.5% chlorine are in the red shade alpha phase.

The process of this invention is applicable to the particle size reduction of metal-free phthalocyanine and to other metal phthalocyanines such as nickel phthalocyanine, cobalt phthalocyanine, aluminum phthalocyanine, iron phthalocyanine, and the like, as well as to their partially chlorinated and their substantially completely chlorinated derivatives. Likewise, it is applicable to mixtures of these products, especially to mixtures of copper phthalocyanine with other metal phthalocyanines and with various substituted phthalocyanines which impart desirable properties to such a mixture. The invention is also applicable to quinacridone pigments of the type disclosed in U.S. Patents 2,844,484, 2,844,485, 2,821,530 and 2,844,581.

The conditions applicable to the dry-milling operation which is the first step in this process are not especially critical. The mill loading is substantially conventional for ball milling operations. Thus, it is conventional for the charge of grinding media to occupy about half of the volume of the mill and for the material being ground to occupy considerably more than the voids between these media so that the total charge in the mill is in the range of 60–65% of the total volume of the mill. It is quite possible to increase the charge to the range of about 75% of the volume of the mill with some increase in the milling time. The choice of these conditions is well within the skill of one versed in this type of operation. The preferred grinding media in the mills are the rod type "Cyl-pebs" described above in Example I, but these may vary in size, and it is quite possible to use ordinary round steel balls varying from ⅛" in diameter up to ½" in diameter or more in the operation. When round balls are used, there is a marked tendency for the charge to cake in the mill under some conditions, and this is often avoided by the addition of materials of an irregular shape, such as nails, to the charge. The use of the rod type "Cyl-pebs" usually obviates this caking.

It is impossible to set up limits as to the length of the dry-milling cycle since it will vary depending upon the pigment being treated, the mill loading, and the type of mill being used. In order to establish the optimum length of time for dry milling a particular pigment under a given set of conditions, it is recommended that the invention be run with variations in the dry-milling time and that rubouts of the finished product be compared with standard rubout samples exhibiting the desired degree of pigment quality. A minimum of 4–6 hours is usually required, and this may be extended to as much as 12–18 hours or even more. It is characteristic of this operation and one of the unexpected features that the dry powder obtained following the milling step shows no significant improvement with respect to ordinary pigment properties over the original crude pigment. It is only when the subsequent treatments with emulsions of organic liquids are applied to this powder that its improved properties become apparent.

The preferred method of dry milling is ball milling. However, any milling or grinding method which utilizes an attrition and shearing action, as distinguished from impact action, may be used. Such attrition and shearing action may be accomplished in rod mills, stirred and vibratory types of ball mills, and the like.

The organic liquids used in this invention have a boiling point between 100° C.– 250° C., and they are selected from the group consisting of nitrobenzene, benzonitrile, unsubstituted aromatic hydrocarbons, chlorinated aromatic hydrocarbons, chlorinated aliphatic hydrocarbons, and mixtures of these liquids. Benzene and xylene are examples of preferred aromatic hydrocarbons, whereas monochlorobenzene and o-dichlorobenzene are preferred chlorinated aromatic hydrocarbons, and tetrachloroethylene is a preferred chlorinated aliphatic hydrocarbon. Also contemplated for use in this invention is trichlorobenzene. The amount of organic liquid should be at least 0.3 part by weight per part of pigment and may be as much as about 3 parts per part of pigment without affecting pigment quality. In general, about 1.5 parts of organic liquid per part of pigment is preferred. The ratio of water to the solvent and to the pigment in the emulsion treatment is quite unimportant as long as there is sufficient water present to produce a fluid slurry which can be easily agitated.

The preferred surface-active agent in this invention is the sodium salt of hydrogenated rosin (an anionic surface-active agent) which has been shown in a number of specific examples. There is also shown in the examples (Examples IV and VI) the use of a non-ionic surface-active agent, and Example VIII shows a cationic type of agent. Other surface-active agents which might be used in this invention include the alkyl aryl sulfonates, cetyl trimethyl ammonium chloride, the long-chain amines, polyoxyethylated vegetable oil, sorbitol monolaurate, and the polyoxy propylene derivatives. In general, those surface-active agents that bring about effective emulsification of the appropriate organic liquid in water may be used. A preferred amount of surface-active agent is 5–10% by weight of the organic liquid. However, the only critical feature is that there be sufficient surface-active agent to bring about effective emulsification. The addition of larger amounts is not harmful except that when the amount becomes a major amount with respect to the pigment, difficulties in filtration of the final product might be encountered.

As pointed out earlier in the specification, contact between the pigment and the emulsion may be carried out simply by stirring the slurry of emulsion and pigment, or contact can take place in a ball mill. The contact time between the organic liquid emulsion and the pigment should not be less than about 1 hour with a somewhat longer time, in the order of at least 2 hours, being definitely preferred. However, if the process of this invention is to be applied to chlorine-free copper phthalocyanine (this is a pigment in which the crystal phase is influenced by crystallizing solvents, see Example VI), there is often advantage in extending the contact time, particularly when it takes place in a ball mill, to as much as 16 hours and even up to about 36 hours, when a single crystal phase is desired. The upper limit on contact time is not particularly critical; however, it will, of course, be realized by those skilled in the art that excessively long periods in a ball mill may have some adverse effect on the pigment.

The preferred method of separating the emulsion from the pigment is by steam distillation, but other methods of separation may also be used. For example, the emulsion could be evaporated off by heating the pigment-emulsion slurry in an open vessel, or the slurry could be filtered and the residual liquid removed by evaporation or steam distillation. In instances where the separation method does not employ heat, heating at temperatures up to the boiling point should be employed prior to the separation step.

The isolation of the pigment following the removal of the organic liquid is conventional in every respect, and there are no critical features to this operation.

Since it is obvious that many changes and modifications can be made in the above-described details without departing from the nature and spirit of the invention, it is to be understood that the invention is not to be limited to said details except as set forth in the appended claims.

We claim:

1. A process for reducing the particle size of a colored pigment selected from the group consisting of phthalocyanine pigments and quinacridone pigments which comprises dry milling said colored pigment in a milling apparatus havng an attrition and shearing action, thereafter contacting said dry-milled pigment with an organic liquid in water emulsion wherein the liquid is selected from the group consisting of nitrobenzene, benzonitrile, unsubstituted aromatic hydrocarbons, chlorinated aromatic hydrocarbons, and chlorinated aliphatic hydrocarbons, boiling between about 100° C.–250° C., and subsequently removing the organic liquid from the pigment by steam distillation.

2. The process of claim 1 in which the organic liquid is o-dichlorobenzene.

3. The process of claim 1 in which the organic liquid is monochlorobenzene.

4. The process of claim 1 in which the organic liquid is tetrachloroethylene.

5. A process for reducing the particle size of a phthalocyanine pigment which comprises dry milling said phthalocyanine pigment in a milling apparatus having an attrition and shearing action, thereafter contacting said dry-milled pigment with an organic liquid in water emulsion wherein the liquid is selected from the group consisting of nitrobenzene, benzonitrile, unsubstituted aromatic hydrocarbons, chlorinated aromatic hydrocarbons, and chlorinated aliphatic hydrocarbons, boiling between about 100° C.–250° C., and subsequently removing the organic liquid from the phthalocyanine pigment by steam distillation.

6. The process of claim 5 in which the pigment is polychloro copper phthalocyanine.

7. The process of claim 5 in which the pigment is partially chlorinated copper phthalocyanine.

8. The process of claim 5 in which the pigment is unsubstituted copper phthalocyanine.

9. The process of claim 5 wherein contact with the emulsion is made by ball milling.

10. A process for reducing the particle size of a quinacridone pigment which comprises dry milling said quinacridone pigment in a milling apparatus having an attrition and shearing action, thereafter contacting said dry-milled pigment with an organic liquid in water emulsion wherein the liquid is selected from the group consisting of nitrobenzene, benzonitrile, unsubstituted aromatic hydrocarbons, chlorinated aromatic hydrocarbons, and chlorinated aliphatic hydrocarbons, boiling between about 100° C.–250° C., and subsequently removing the organic liquid from the pigment by steam distillation.

References Cited in the file of this patent

UNITED STATES PATENTS

| | | |
|---|---|---|
| 2,282,006 | Sloan | May 5, 1942 |
| 2,327,472 | Vesce | Aug. 24, 1943 |
| 2,556,726 | Lane | June 12, 1951 |
| 2,556,727 | Lane | June 12, 1951 |
| 2,645,643 | Gottlieb | July 14, 1953 |
| 2,833,782 | Stryker | May 6, 1958 |
| 2,857,400 | Cooper | Oct. 21, 1958 |

FOREIGN PATENTS

| | | |
|---|---|---|
| 469,139 | Great Britain | July 20, 1937 |